United States Patent [19]

Wolk et al.

[11] 3,972,803

[45] Aug. 3, 1976

[54] PRODUCTION OF LOW SULFUR FUEL OIL AND HYDROGEN FROM PETROLEUM RESIDUUM

[75] Inventors: Ronald H. Wolk, Trenton, N.J.; Axel R. Johnson, North Babylon, N.Y.; Govanon Nongbri, Newtown, Pa.

[73] Assignee: Hydrocarbon Research, Inc., Morristown, N.J.

[22] Filed: Feb. 15, 1974

[21] Appl. No.: 443,025

[52] U.S. Cl. ............................... 208/97; 208/108; 208/213
[51] Int. Cl.² ................. C10G 37/00; C10G 23/10
[58] Field of Search .................. 208/108, 97, 213; 48/197 R, 212

[56] References Cited
UNITED STATES PATENTS

| | | | |
|---|---|---|---|
| 3,183,179 | 5/1965 | Schuman | 208/97 |
| 3,291,721 | 12/1966 | Schuman | 208/97 |
| 3,412,010 | 11/1968 | Alpert et al. | 208/108 |
| 3,442,793 | 5/1969 | Carson | 208/108 |
| 3,480,419 | 11/1969 | Alliot et al. | 48/212 |
| 3,549,517 | 12/1970 | Lehman et al. | 208/108 |
| 3,755,137 | 8/1973 | Schuman | 208/108 |
| 3,769,197 | 10/1973 | Leas et al. | 48/197 R |

*Primary Examiner*—Delbert E. Gantz
*Assistant Examiner*—James W. Hellwege

[57] ABSTRACT

In producing low sulfur fuel oil by the ebullated bed hydroconversion of petroleum residue, the resulting heavy vacuum bottoms sulfur-containing residue material is utilized to produce hydrogen. The residue material from the hydroconversion operation is gasified to provide a fuel gas, which is then used to fire a steam-methane reformer. The chemical requirements for hydrogen production are met by feeding a portion of light gaseous products from the hydroconversion step to the catalytic side of the steam-methane reformer. A low sulfur fuel oil distillate product is recovered from the reactor effluent streams and can be further hydrotreated as desired. Thus, all hydrogen required in the H-Oil reactor for hydroconversion and desulfurization is ultimately produced from the residual oil feed material, by using the heavy product residue material to produce a fuel gas and converting the light hydrocarbons to hydrogen.

8 Claims, 2 Drawing Figures

PRODUCTION OF LOW SULFUR FUEL OIL AND HYDROGEN FROM PETROLEUM RESIDUUM

BACKGROUND OF THE INVENTION

The hydroconversion of both crude and residual oils in an upflow ebullated bed reactor to produce desirable light oil and gaseous product streams is well known, having been disclosed by various U.S. Patents, e.g., U.S. Pat. No. Re.25,770 to Johanson, U.S. Pat. No. 3,291,721 to Schuman and U.S. Pat. No. 3,412,010 to Alpert et al. Another product from such hydroconversion reactions is the heavy vacuum bottoms 975°F plus or higher boiling pitch material which contains a significant proportion of the sulfur originally found in the oil feed stream. This heavy residue material has heretofore been either fed to a coker or blended in with the fuel oil products. However, as the permissible sulfur content of fuel oil products have been progressively lowered below 0.5 wt. percent due to air pollution restrictions, progressively less of this heavy pitch material can be utilized in the low sulfur fuel oil product. The result is that this heavy, high sulfur material has heretofore either been used as in-plant fuel which is no longer permissible, or applied to uses having low economic value.

There has usually been a lack of adequate supply of inexpensive hydrogen needed for hydrotreating the crude oil or residuum feed streams in the hydroconversion process. However, no convenient way has heretofore existed for using this heavy sulfur-containing residue material to alleviate the hydrogen shortage problem.

SUMMARY OF THE INVENTION

This invention pertains to the hydroconversion of residual oils to produce low sulfur light fuel oil and gaseous product streams, wherein the heavy 975°F plus residual hydrocarbon fraction produced from such hydroconversion is first gasified to produce a fuel gas. The resulting fuel gas is purified to remove sulfur and then used to fire a steam-methane reformer, which produces hydrogen by using a portion of the $C_1$–$C_4$ gaseous products from the reactor effluent vapor streams as feed material. The hydrogen thus produced is used in the hydroconversion reaction zone as needed to hydrogenate the feed material, and a net hydrogen product stream may be withdrawn if desired. Thus, the sulfur contained in the heavy pitch fraction from the reactor is removed from the fuel gas by conventional gas scrubbing means after gasification. A light fuel oil product containing less than about 1.0 wt. percent sulfur is withdrawn from the high pressure phase separation step as the principal product. The portion of light gas product not needed for hydrogen production in the reformer may be withdrawn as another product. Also if desired, the light fuel oil product may be passed through a fixed bed catalytic hydrotreater together with hydrogen for reduction of its sulfur content to below about 0.2 wt. percent sulfur.

This invention permits maximizing the production of low sulfur fuel oil from petroleum residuum by ebullated bed hydroconversion, while using the sulfur-containing residue as fuel for production of the hydrogen needed in the hydrogenation step. A portion of the gas oil produced in a separation step is usually recycled to the reaction zone to facilitate its operation.

DESCRIPTION OF THE PREFERRED EMBODIMENT

Figure 1:
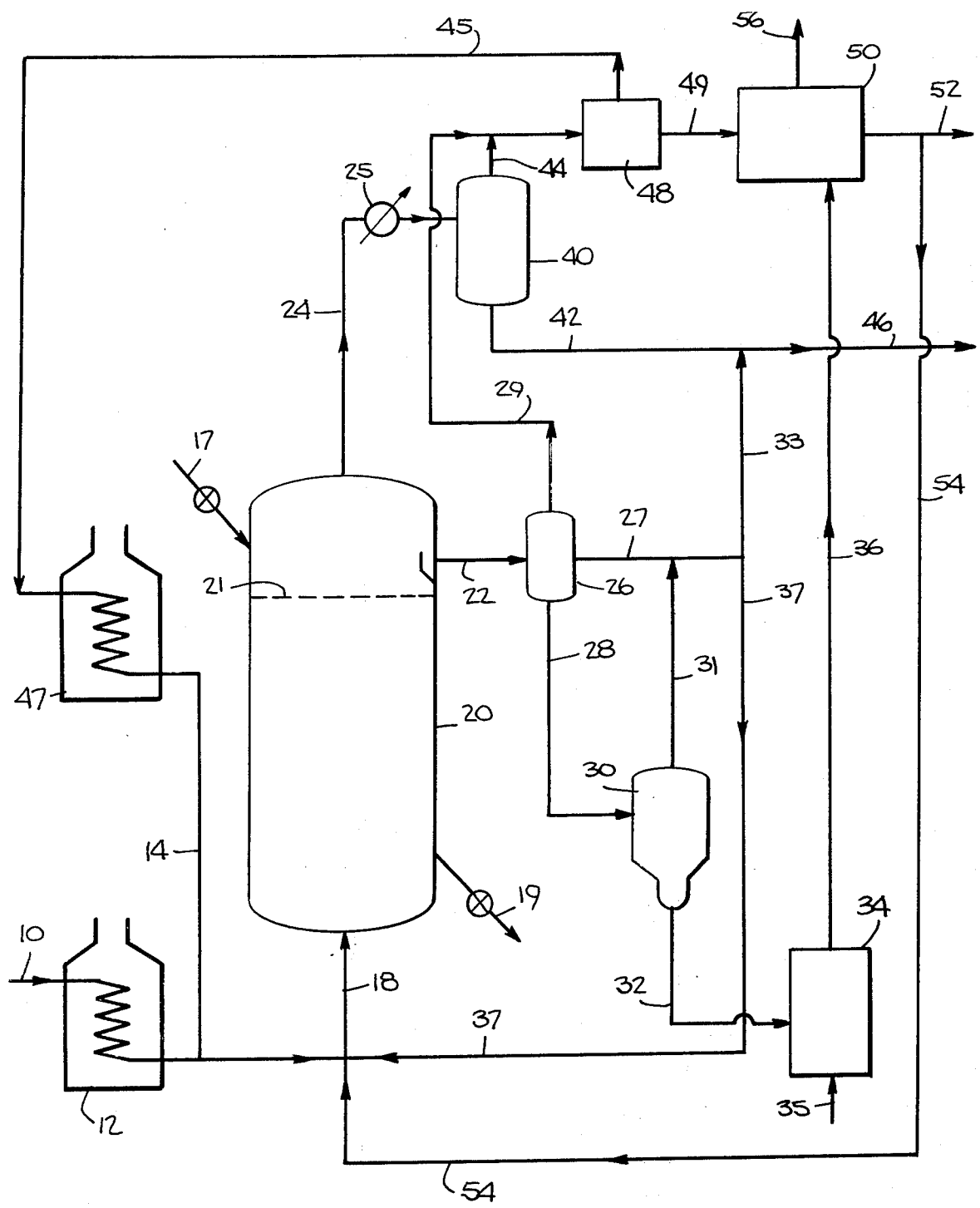
FIG. 1 is a schematic flowsheet illustrating the essential features of the invention to produce low sulfur fuel oil, wherein the makeup hydrogen is produced from the gaseous products of the hydroconversion reaction, and a net stream is produced.

As shown in FIG. 1, a petroleum residuum oil stream 10 containing more than about 2% sulfur is heated at 12 and fed through conduit 18 to ebullated bed catalytic reactor 20 along with a medium purity hydrogen recycle stream 14. Under reactor conditions of 750°–900°F temperature, 1000–3000 psig hydrogen partial pressure, with at least 4000 SCF hydrogen per barrel residuum fed upwardly and in the presence of a suitable particulate catalyst, a hydroconversion process occurs within the ebullated bed reaction zone with the result that light hydrocarbon liquids and gases are produced. Liquid space velocity within the reaction zone should be between 0.15–1.0 $V_f$/hr/$V_r$ (volume of feed per hour per volume of reactor). The particulate catalyst material is replaced as necessary by the addition of fresh catalyst at connection 17 and removal of spent material at connection 19 to maintain the desired level of activity, with usual catalyst replacement rates being 0.08–0.80 lb/barrel of residuum feed.

Effluent liquid stream 22 and gas stream 24 are withdrawn separately from the upper portion of reactor 20 above the upper level 21 of the ebullated catalyst bed. Liquid stream 22 is reduced in pressure into flash tank 26, from which liquid stream 28 is withdrawn and passed to vacuum tower 30. The vacuum bottoms liquid stream 32 removed from vacuum tower 30 is a heavy residue or pitch material having a boiling point above 975°F and containing more than about 1% sulfur, illustratively from about 1 to about 5%. It is introduced into gasifier 34 where the heavy pitch is heated and partially combusted in the presence of oxygen from oxygen-containing gas stream 35, which is preferably air, thus producing fuel gas stream 36 having low heating value. Sulfur removal is usually accomplished on the fuel gas stream 36 by conventional means (not shown), such as carbonate scrubbing of the gas. Cleaned gas stream 36 is then used to fire steam-methane reformer 50 as hereinafter described.

Liquid gas oil stream 27 from low pressure separator 26 and stream 31 off the top of vacuum separator 30 are combined as stream 33 and mixed with the product fuel oil stream 42 as hereinafter described. Gas stream 29 from separator 26 is fed to hydrogen purification unit 48 as hereinafter described. Also, it is usually desirable to return some of the gas oil withdrawn off separators 26 and 30 as stream 37 to the reactor 20 for improved control of the hydroconversion process.

Returning now to gaseous effluent stream 24, it is cooled in exchanger 25 and flows into separator 40 from which liquid stream 42 and gaseous stream 44 are withdrawn. Liquid stream 42 is reduced in pressure and then combined with stream 33 as previously mentioned and withdrawn as the low sulfur fuel oil product stream 46 containing less than about 1.0 wt. percent sulfur.

Gaseous stream 44 which comprises methane, ethane, propane and sometimes butane and pentane, is passed as feed to hydrogen purification unit 48 for recovery of medium purity hydrogen stream 45 (85–90% purity) which is recycled to the reaction zone 20 after reheating at 47. Hydrogen-containing stream 49 is passed to stream-methane reformer 50 for conversion into high purity hydrogen. Heat for the reformer 50 is provided by fuel gas stream 36 as previously mentioned. A major portion of this hydrogen produced in reformer 50 at above about 95% purity is recycled to reactor 20 via makeup stream 54. However, if desired, a net hydrogen product may be withdrawn as stream 52. Resulting flue gas is withdrawn from reformer 50 as stream 56.

Figure 2:
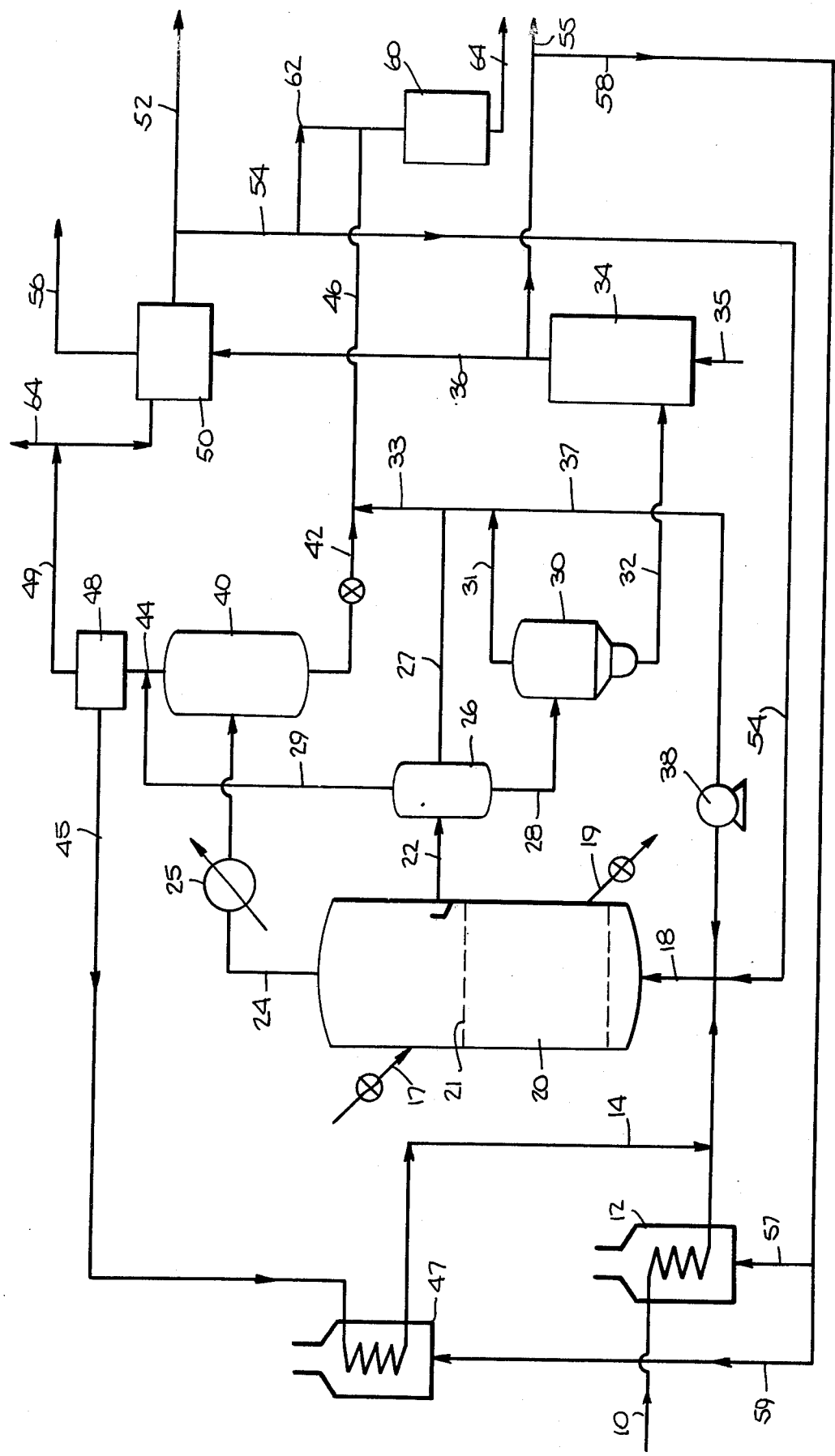
FIG. 2 is a schematic flowsheet illustrating an alternative embodiment of this invention, wherein the fuel oil product is further processed in a fixed bed hydrotreater to further reduce its sulfur content.

Alternative features of this invention are illustrated in FIG. 2, wherein equivalent elements have the same item numbers as in FIG. 1. Petroleum residuum oil stream 10 containing more than about 2% sulfur is similarly heated at 12 and fed through conduit 18 to ebullated bed catalytic reactor 20 along with recycle hydrogen stream 14. Under the reaction conditions of temperature and pressure and in the presence of suitable particulate catalyst, a hydroconversion of the residuum feed material occurs in the ebullated bed reaction zone with the result that light hydrocarbon liquids and gases are produced.

Effluent liquid stream 22 is withdrawn from reactor 20 separately from gas stream 24. Stream 22 is reduced in pressure into flash tank 26, from which liquid stream 28 is withdrawn and passed to vacuum tower 30 as before. The vacuum bottoms liquid stream 32 removed from vacuum tower 30 is a heavy residue or pitch material having boiling point above 975°F and containing more than about 1% sulfur. It is introduced into gasifier 34 where the heavy pitch is heated and partially combusted in the presence of oxygen from stream 35, thus producing fuel gas stream 36 having low heating value. Gas stream 36 is used to fire steam-methane reformer 50 as hereinafter described. If desired, a portion 58 of the fuel gas stream 36 may be used to fire the feed-stream heater 12 via stream 57 and to fire the recycle hydrogen heater 47 via stream 59 as necessary. Also if desired, a minor stream 55 may be withdrawn as fuel gas product.

Liquid gas oil stream 27 off the top of separator 26 and stream 31 off the top of vacuum separator 30 are combined as stream 33 and mixed with the product fuel oil stream 42 as previously described. Gas stream 29 from separator 26 is fed to hydrogen purification unit 48 as previously described. Also, whenever feed stream 10 is a vacuum residuum material, it is preferable to return some of the gas oil produced in separators 26 and 30 to the reactor 20 as stream 37 via pump 38.

Returning now to gaseous effluent stream 24, it is cooled at 25 and flows into separator 40 from which liquid stream 42 and gaseous stream 44 are withdrawn. Liquid stream 42 is reduced in pressure and combined with stream 33 and withdrawn as the low sulfur fuel oil product stream 46 containing less than about 1.0 wt. percent sulfur.

If desired, fuel oil stream 46 may be passed to a fixed bed type catalytic hydrotreater 60 to further reduce its sulfur content to below about 0.2 wt. percent. Hydrogen needed in the hydrotreater 60 is provided from the steam-methane reformer 50 through streams 54 and 62.

Gaseous stream 44 which comprises methane, ethane, propane and sometimes butane and pentane is passed as feed to hydrogen purification unit 48 for recovery of medium purity recycle hydrogen stream 45 which is returned to the reaction zone 20 after reheating at heater 47. The resulting hydrogen-containing stream 49 is passed to steam-methane reformer 50 for conversion into hydrogen. Heat for the furnace in reformer 50 is provided by fuel gas stream 36 as previously mentioned. A major portion of this hydrogen produced in reformer 50 at about 95% purity is recycled to reactor 20 as makeup hydrogen stream 54. However if desired, a net hydrogen product may be withdrawn as stream 52. If all the light gas product stream 49 is not needed as feed to produce hydrogen in the reformer 50, a portion may be withdrawn as net fuel gas product stream 64.

Although this invention has been described for use with a single stage ebullated bed reaction zone, it is also applicable for use with multiple stage reactors connected in series. It permits the production of fuel oil products having lower sulfur content than can be produced by processes in which the heavy residue or pitch material from the hydroconversion step is blended in with the liquid product. Significantly, the process requires no external source of hydrogen.

EXAMPLES

Examples of several petroleum residuum feed materials for which this invention is useful, along with operating parameters which are applicable for each feed material are listed in the Table below:

The catalyst material used is cobalt molybdenum on alumina. Other commercial porous extrudate materials can be similarly employed.

TABLE

| Feed Material | Kuwait Atm. Bottoms | Kuwait Vac. Bottoms | Khafji Atm. Bottoms | Khafji Vac. Bottoms |
|---|---|---|---|---|
| Sulfur content, wt. % | 3.7 | 5.3 | 4.3 | 5.4 |
| No. stages | 1 | 2 | 2 | 2 |
| Reactor Pressure, psig | 2000 | 2000 | 2000 | 2000 |
| Temperature, °F | 825 | 845 | 830 | 845 |
| Liquid Space Velocity, $V_f/hr/V_r$ | 0.49 | 0.41 | 0.5 | 0.41 |
| $H_2$ consumption, SCF/bbl | 850 | 1650 | 1050 | 1600 |
| Catalyst Replacement, lb/bbl | 0.15 | 0.20 | 0.15 | 0.20 |
| Conversion, Vol. % | 75 | 84 | 76.3 | 84.4 |
| 975°F minus Yield, V % | 90.5 | 92.0 | 89.1 | 91.0 |
| Pitch to Gasifier, Vol. % | 10.6 | 16.0 | 12.1 | 15.6 |
| Feed to Reformer, wt. % | 4.8 | 6.4 | 5.3 | 6.4 |
| Heavy gas oil recycle ratio, $V_{go}/V_f$ | 0 | 0.5 | 0 | 0.5 |
| Sulfur in full oil product, wt. % | 0.72 | 0.57 | 0.73 | 0.6 |
| W % S after hydrotreater | 0.1 | 0.1 | 0.1 | 0.1 |

While we have shown and described preferred forms and embodiments of our invention, we are aware that modifications may be made thereto which are within the spirit and scope of the description herein and as defined by the appended claims.

We claim:

1. A process for producing low sulfur fuel oil by the hydroconversion of a petroleum residuum feed material having at least 10% by volume boiling above 975°F and containing at least 2 wt. percent sulfur, which comprises:
   a. passing the feed at a temperature between 750° and 900°F and a hydrogen partial pressure of 1000–3000 psig together with at least 4000 scf hydrogen per barrel residuum feed upwardly through an ebullated bed reaction zone containing a hydrogenation type particulate catalyst;
   b. controlling the space velocity within the reaction zone between 0.15–1.0 $V_f/hr/V_r$ to accomplish at least 40% conversion of the 975°F plus boiling components in the feed to materials boiling below 975°F and to partially remove sulfur;
   c. withdrawing a light hydrocarbon containing gaseous effluent stream from the reaction zone, passing it to a separation step for separating into gaseous and liquid portions, and recovering medium purity hydrogen from the gaseous portion for recycle to the reaction zone;
   d. withdrawing a liquid effluent stream from the reaction zone and passing it to a distillation step;
   e. withdrawing a heavy hydrocarbon residue stream from the distillation step, passing said stream with oxygen-containing gas to a gasification step, and producing a fuel gas stream therefrom;
   f. passing said fuel gas to a steam-methane reformer for combustion therein as a heat source;
   g. passing at least a portion of the light hydrocarbon gases withdrawn off the reaction zone to the steam-methane reformer as feed material to produce high purity hydrogen therein;
   h. returning a portion of the high purity hydrogen produced in step (g) to the reaction zone to partially hydrogenate the feed stream; and
   i. withdrawing a fuel oil product stream off the separation and distillation process of steps (c) and (d) containing less than about 1.0 wt. percent sulfur.

2. The process of claim 1 wherein the low sulfur fuel oil product stream is further treated in a fixed bed catalytic hydrotreater to reduce its sulfur content to less than about 0.2 wt. percent.

3. The process of claim 1 wherein the feed stream to the gasifier in step (e) is vacuum bottoms liquid, and a gas oil stream derived from the distillation of step (d) is recycled to the reaction zone to assist in controlling the liquid density therein.

4. The process of claim 1 wherein at least a portion of the high purity hydrogen returned to the reaction zone is used to preheat the residuum feed stream.

5. The process of claim 1 wherein a portion of the fuel gas produced from the gasification step (e) is burned to provide heat to the petroleum residuum feed stream.

6. The process of claim 1 wherein a portion of the high purity hydrogen produced in the steam-methane reformer is withdrawn as net hydrogen product.

7. The process of claim 1 wherein a portion of the fuel gas from the gasification step (e) is withdrawn as a net fuel gas product.

8. The process of claim 1 wherein multiple ebullated bed reaction zones in series are used to hydrogenate the feed stream and increase the percentage desulfurization of the residuum feed.

* * * * *